Dec. 6, 1966   R. F. DAVIS   3,290,069
TUBE FITTING
Filed Sept. 3, 1964
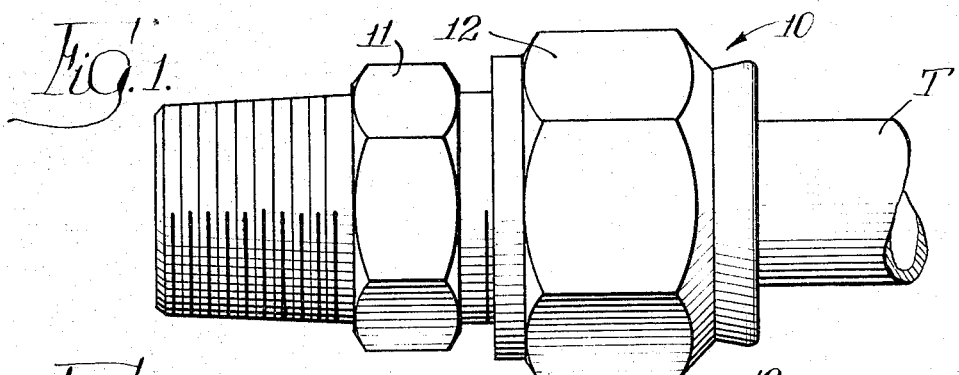
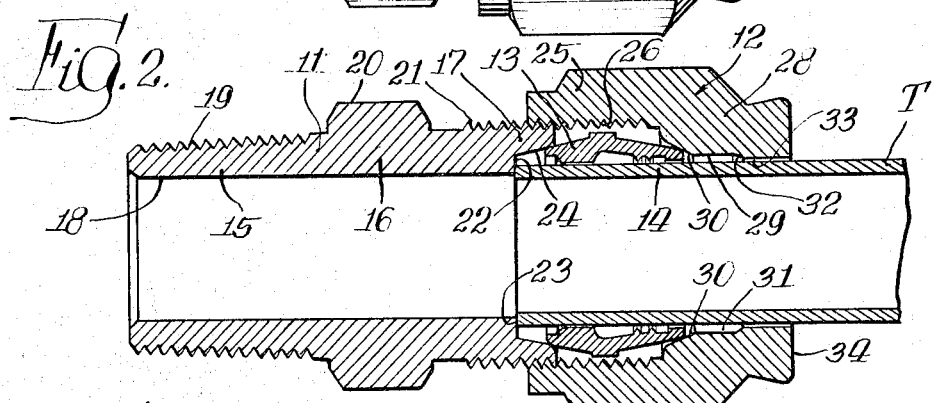
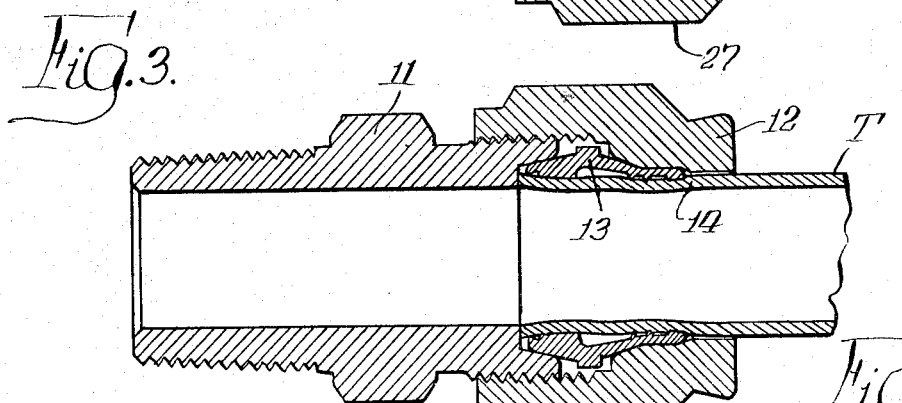
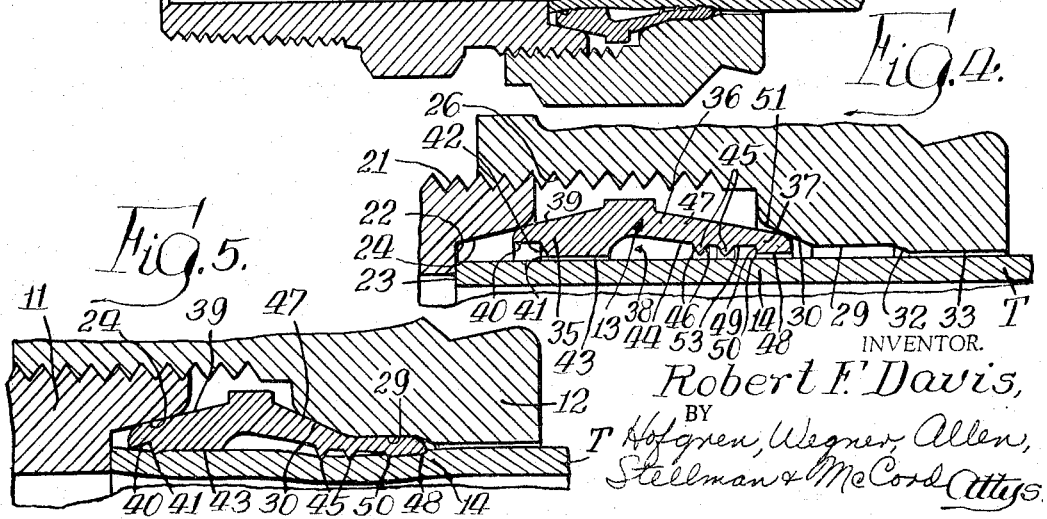
INVENTOR.
Robert F. Davis,
BY
Hofgren, Wegner, Allen,
Stellman & McCord Attys.

United States Patent Office 3,290,069
Patented Dec. 6, 1966

3,290,069
TUBE FITTING
Robert F. Davis, Morton Grove, Ill., assignor to Imperial-Eastman Corporation, a corporation of Illinois
Filed Sept. 3, 1964, Ser. No. 394,262
4 Claims. (Cl. 285—341)

This invention relates to tube fittings and in particular to fittings for coupling straight ended tubes.

In one conventional form of fitting for coupling straight ended tubes, an annular sleeve member is provided which is adapted to be constricted into sealing locked association with the tube end. The desired constriction of the sleeve member is obtained by means of a nut member secured to a body member with camming surfaces on the respective members preselected to effect the desired constriction as a result of the advance of the nut member toward the body member during assembly, or make-up, of the fitting. In such make-up of the fitting it is desirable to provide a "hit home" indication of the completion of the make-up so that overstressing of the fitting elements and excessive deformation of the tube end is effectively precluded. Further, it is desirable in such fittings to provide for positive support of the tube end against vibrations and the like tending to loosen the fitting and destroy the sealed connection thereof with the tube end. Such fittings heretofore have had relatively limited pressure range capabilities and it is desirable to extend these capabilities so that these fittings may be satisfactorily usable at relatively high pressure such as 35,000 p.s.i. and above.

The present invention comprehends a fitting of the above type having new and improved means providing the above discussed desirable features in a novel and simple manner.

Thus, a principal object of the present invention is the provision of a new and improved fitting for use with straight ended tubing.

A further object of the invention is the provision of such a fitting having a new and improved sleeve member for improved support of the tube end in the fitting.

Another object of the invention is the provision of such a fitting having new and improved means for providing a "hit home" indication of the completion of the make-up of the fitting.

Still another object of the invention is the provision of such a fitting having new and improved means at the nose end of the sleeve member for sealingly engaging the tube end.

A yet further object of the invention is the provision of such a fitting having new and improved means at the nose end of the sleeve member for supporting the tube end in the body member.

A still further object of the invention is the provision of such a fitting having new and improved means for supporting the tube end at axially spaced positions to provide an improved resistance to loosening of the fitting as from vibration.

A yet further object of the invention is the provision of such a fitting including a body member having an inner end, a bore having an opening through the inner end, an annular tube stop on the inner end concentrically about the bore opening, and an axially inwardly widening annular first cam surface concentrically about the bore opening radially outwardly of the tube stop, a nut member having a bore defining a second cam surface including an axially outer, axially inwardly narrowing frusto-conical portion and a contiguous axially inner cylindrical portion, cooperating means on the body member and nut member for forcibly advancing the second cam surface toward the inner end of the body member, and an annular sleeve member having an axially outer portion, a contiguous axially inner portion, and an axial bore therethrough, the axially outer portion of the sleeve member including a radially outer, inwardly widening third cam surface for engagement with the first cam surface of the body to constrict the axially outer portion of the sleeve member radially inwardly as a result of advancement of the sleeve member toward the inner end of the body, the axially outer portion further including an axially outer, radially inner annular recess defining an annular, sharp edge for biting into the wall of a tube end extending coaxially through the nut member and sleeve member bores into engagement with the tube stop of the body member, the axially inner portion of the sleeve member including a radially inner, axially inwardly narrowing annular surface provided with radially inwardly projecting means for biting into the wall of the tube end and further including a radially outer, axially inwardly narrowing fourth cam surface for engagement by the second cam surface of the nut member to constrict the axially inner portion of the sleeve member radially inwardly as a result of advancement of the nut member toward the inner end of the body member.

Another object of the invention is the provision of such a fitting having a sleeve member further including an axially inner portion having a radially inner, cylindrical surface for facial engagement with the tube end, an axially outer, radially inner sharp edge for biting into the wall of the tube end, and a radially outer, axially inwardly narrowing fifth cam surface comprising an extension of said fourth cam surface for engagement with the second cam surface of the nut member to constrict the axially inner portion of the nut member radially inwardly as a result of the advancement of the nut member toward the inner end of the body member.

Other objects and advantages of the invention will be apparent from the following description taken in connection with the accompanying drawing wherein:

FIGURE 1 is a side elevation of a fitting embodying the invention, having a portion of the tube end connected thereto;

FIGURE 2 is a diametric section thereof with the elements of the fitting as arranged as at the beginning of a make-up thereof;

FIGURE 3 is a diametric section thereof with the elements of the fitting as arranged as at the completion of the make-up thereof;

FIGURE 4 is a fragmentary enlarged diametric section of a portion of the fitting as arranged in FIGURE 2; and FIGURE 5 is a fragmentary enlarged diametric section of a portion of the fitting as arranged in FIGURE 3.

In the exemplary embodiment of the invention as disclosed in the drawing, a fitting generally designated 10 is shown to comprise a body member 11, a nut member 12, and a sleeve member 13. The nut member 12 is arranged to be threadedly connected to the body member 11 with the sleeve member 13 disposed therebetween so that upon advancement of the nut member toward the body member, the sleeve member is constricted into sealing supporting engagement with the straight end 14 of the tube T to be connected, such as a metallic tube, thereby to sealingly connect the tube end 14 to the body member 11 for sealingly coupling the tube end to another element (not shown).

The present invention comprehends an improved fitting arrangement wherein the sleeve member 13 provides a plurality of sealing engagements with the tube end 14 and a plurality of spaced supports of the tube end for effecting a substantially improved coupling of the tube end in a novel and simple manner.

More specifically, the body member 11 includes an axially outer end 15, a mid-portion 16, and an axially inner end 17 with a bore 18 extending coaxially successively through the different portions of the body member. The outer end 15 of the body member may be further provided with a threaded outer surface 19 for threaded engagement with an element (not shown) to which the tube end 14 is to be connected. The mid-portion 16 may be provided with a plurality of annularly arranged flats 20 to be engaged by a suitable tool such as a wrench (not shown) as in make-up of the fitting.

Inner end portion 17 of the body member is provided with an external thread 21, and is defined internally by a radial shoulder 22 into which bore 18 opens coaxially. The shoulder 22 effectively defines a tube stop against which the distal end 23 of the tube end 14 abuts in the made-up arrangement of the fitting. Extending axially inwardly from the tube stop 22 is a frusto-conical, axially inwardly widening, first cam surface 24.

Nut member 12 includes an axially outer portion 25 having an internal thread 26 arranged for threaded association with body thread 21 for selective advancement and withdrawal of the nut member 12 relative to the body as an incident of rotation of the nut member relative to the body member. The nut member may be provided exteriorly with a plurality of flats 27 for engagement by a suitable tool such as a wrench (not shown) in make-up of the fitting. The axially inner end portion 28 of the nut member is radially inwardly defined by a second cam surface 29 including an axially outer, axially inwardly narrowing frusto-conical surface portion 30 and a cylindrical surface portion 31 extending axially inwardly from the frusto-conical portion 30. A frusto-conical, axially inwardly narrowing, surface portion 32 extends axially inwardly from the inner end of the cylindrical portion 31 into a cylindrical portion 33 opening through the inner end 34 of the nut member. As best seen in FIGURE 2, the diameter of the cylindrical surface 33 is slightly larger than the outer diameter of the tube end 14.

Sleeve member 13 includes an axially outer portion 35, a mid-portion 36, and a contiguous axially inner portion 37. An axial bore 38 extends through the sleeve member. The axially outer portion 35 includes a radially outer, inwardly widening, third cam surface 39 which is frusto-conically complementary to the frusto-conical first cam surface 24 of body member 11. The axially outer portion 35 of the sleeve member further includes an axially outer, radially inner annular recess 40 defining a sharp annular biting edge 41. The recess is defined at its axially inner end by an axially inwardly widening, frusto-conical end surface 42. The portion 43 of the bore 38 disposed within axially outer portion 35 of the sleeve member is cylindrical having a diameter slightly greater than the outside diameter of the tube end 14.

The mid-portion 36 of the sleeve member 13 includes a radially inner, axially inwardly narrowing, annular surface 44 provided with a plurality (herein two) of radially inwardly projecting ribs 45 for sealingly biting into the wall of the tube end 14 in the made-up arrangement of the fitting, as shown in FIGURE 5. As best seen in FIGURE 4, each of the axially inner and axially outer surfaces 46 of the ribs 45 is frusto-conical. The mid-portion 36 of the sleeve member is defined exteriorly by an axially inwardly narrowing, frusto-conical fourth cam surface 47 arranged to be engaged by the second cam surface 29, 30 of the nut member 12 to constrict the mid-portion of the sleeve member radially inwardly to the made-up arrangement of the fitting, as shown in FIGURE 5.

The axially inner portion 37 of the sleeve member 13 includes a radially inner cylindrical surface 48 having a diameter slightly greater than the outside diameter of the tube end 14. The axially inner end of the sleeve member is further defined by a radial surface 49 at the inner end of the cylindrical surface 48 and defining at the juncture therewith a sharp annular biting edge 50 arranged to bite into the tube 14 in the made-up arrangement of the fitting, as shown in FIGURE 5. The inner portion 37 of the sleeve member is defined exteriorly by a frusto-conical axially inwardly narrowing, fifth cam surface 51 which comprises an extension of cam surface 47. As shown in FIGURE 5, the radial constriction of the end portion 37 of the sleeve member effected by the engagement of nut member cam surface 29, 30 with the cam surface 51 of the sleeve member effects a radial constriction of the inner portion 37 to cause the surface 48 thereof to be in intimate facial engagement with the tube wall in the made-up arrangement of the fitting, and the sharp edge 50 to be pressed deeply into the outer surface of the tube wall in that arrangement.

In one specific illustrative embodiment of the invention, the fitting 10 may be arranged with the angle of the frusto-conical cam surface 39 relative to the axis of the fitting being approximately 12 degrees, the angle of the frusto-conical cam surface 47 relative to the axis of the fitting being approximately 8 degrees, the angle of the frusto-conical undercut surface 42 to a plane radial to the axis of the fitting being approximately 2 degrees, and the angle of the frusto-conical surface 44 to the axis of the fitting being approximately 5 degrees. The diameter of the cylindrical surface 48 is preferably larger than the outer diameter of the tube 14 by approximately one-half the height of the adjacent annular rib 45. Between the innermost rib 45 and the planar surface 49, the mid-portion of the sleeve member may be defined by a cylindrical surface 53. The annular ribs 45 may have identical construction and, herein, are defined by an included angle of approximately 60 degrees symmetrical about a radial line extending at an angle of approximately 75 degrees to the axis of the fitting. The sleeve member may be formed of a suitable material such as brass.

The make-up of the fitting 10 is as follows. The nut member 12 and sleeve member are firstly installed over the end 14 of the tube to be connected and the nut member is then threaded onto the body member surface 21 by finger-tightening to the arrangement of FIGURE 2 wherein the sleeve member is retained between the body member surface 24 and the nut member surface 30. The nut member is then forcibly threaded onto the body member from the position of FIGURE 4 to the position of FIGURE 5. As a result of the threaded advancement, the cam surface 29, 30 of the nut member moves axially toward the body member forcing the sleeve member slightly axially outwardly, or to the left as shown in FIGURE 4, and causing the sharp annular edges 41 and 50 to dig into and sealingly engage the tube 14. The relatively thin construction at the outer end of the sleeve as provided by the recess 40 permits a facilitated radially inward constriction of the outer end of the sleeve to facilitate the biting into the tube wall by edge 41. At the same time, the radial constriction of the axially inner end portion 37 of the sleeve member causes the cylindrical surface 48 to have a positive facial gripping engagement with the outer surface of the tube wall to provide an improved support of the tube at the outer end of the fitting. Still further, the radially inward constriction of the mid-portion of the sleeve member causes the annular ribs 45 to bite into the tube wall and provide a primary gripping retention of the tube by the sleeve to prevent axial displacement of the tube away from the body member after the fitting is made-up. At the same time, the biting engagement of the annular ribs 45 into the tube wall provides a supplementary seal of the sleeve to the tube wall at this point. Still further, the cylindrical surface 43 of the fitting is brought into facial supporting engagement with the tube wall adjacent the nose portion of the sleeve member to provide a further support of the tube in the fitting upon completion of the make-up thereof, as shown in FIGURE 5.

Thus, the tube 14 is supported at each of the inner and outer ends of the sleeve member by the facial engagements of the cylindrical surfaces 43 and 48 therewith. The sleeve is sealingly engaged with the tube at each of the annular edges 41 and 50 and each of the annular ribs 45 to provide four additional retaining portions of the sleeve relative to the tube wall. Each of the edges 41 and 50 and ribs 45 provides an additional function of a sealing connection of the sleeve member to the tube. The forceful wedging action of the axially outer portion 35 of the sleeve member between the tube wall and the camming surface 24 provides an improved seal between the sleeve and the body member to complete the sealed connection of the tube to the body member.

Still further, the improved fitting 10 provides the highly desirable feature of an improved "hit home" indication wherein each of the cylindrical surfaces 43 and 48 signals the completion of the make-up of the fitting by the facial engagement thereof with the cylindrical outer surface of the tube wall. Thus, over torquing of the fitting is effectively positively precluded.

Disassembly of the fitting at any time is extremely simple. The user need merely withdraw the nut member 12 by a suitable reverse rotation thereof to back the nut member away from the sleeve member fixed to the end of the tube until the nut member becomes fully separated from the body member, permitting the tube end with the sleeve member mounted thereon to be withdrawn from the body member as desired.

Fitting 10 provides an improved high pressure fitting found to be capable of handling fluids at hydrostatic pressures in excess of 35,000 p.s.i. The fitting is extremely simple and economical of construction and provides for facilitated and substantially foolproof make-up by effectively precluding excessive torquing during the making up of the fitting.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A fitting for use with straight-ended tubing, comprising:
 a body member having an inner end, a bore having an opening through said inner end, an annular tube stop on said inner end concentrically about said bore opening, and an axially inwardly widening annular first cam surface concentrically about said bore opening, radially outwardly of said tube stop;
 a nut member having a bore defining a second cam surface including an axially outer, axially inwardly narrowing frusto-conical portion and a contiguous axially inner cylindrical portion;
 cooperating means on said body member and nut member for forcibly advancing said second cam surface toward said inner end of the body member; and
 an annular sleeve member having an axially outer portion, a mid-portion, an axially inner portion, and an axial bore therethrough, said axially outer portion of the sleeve member including a radially outer, inwardly widening third cam surface for engagement with said first cam surface of the body to constrict said axially outer portion of the sleeve member radially inwardly as a result of advancement of the sleeve member toward said inner end of the body and an inner cylindrical surface arranged to have facial engagement with the tube as a result of constriction of said axially outer portion of the sleeve member by said first cam surface, said axially outer portion further including an axially outer, radially inner annular recess defining an annular, sharp edge for biting into the wall of a tube end extending coaxially through said nut member and sleeve member bores into engagement with said tube stop of the body member, said mid-portion of the sleeve member including a radially inner, axially inwardly narrowing annular surface provided with radially inwardly projecting means for biting into the wall of the tube end, said mid-portion further including a radially outer, axially inwardly narrowing fourth cam surface for engagement with said second cam surface of the nut member to constrict said mid-portion and axially inner portion of the sleeve member radially inwardly as a result of advancement of the nut member toward said inner end of the body member, and said axially inner portion of the sleeve member including a radially inner, cylindrical surface for facial engagement with the tube, an axially outer radial surface intersecting said cylindrical surface and defining therewith a sharp edge for biting into the wall of the tube end, and a radially outer, axially inwardly narrowing fifth cam surface comprising an extension of said fourth cam surface for engagement with said second cam surface of the nut member to constrict said axially inner portion of the nut member radially inwardly as a result of the advancement of the nut member toward said inner end of the body member.

2. The fitting of claim 1 wherein said sharp edge of the annular recess in the axially outer portion of said sleeve member is defined by an axially inner surface of said recess intersecting said inner cylindrical surface of said axially outer portion of the sleeve member at substantially an obtuse angle.

3. The fitting of claim 2 wherein said axially surface defining the annular recess is frusto-conical widening axially outwardly.

4. The fitting of claim 1 wherein said cylindrical surface of the axially inner portion of said sleeve member has lesser axial extent than said axially inner cylindrical portion of the second cam surface of said nut member.

References Cited by the Examiner

UNITED STATES PATENTS

| 2,453,024 | 11/1948 | Lomelino | 285—343 |
| 2,613,959 | 10/1952 | Richardson | 285—341 |
| 2,641,487 | 6/1953 | La Marre | 285—382.7 X |
| 2,693,374 | 11/1954 | Wurzberger | 285—343 |
| 2,693,376 | 11/1954 | Wurzberger | 285—382.7 X |
| 2,761,704 | 9/1956 | Crawford | 285—342 |
| 2,930,635 | 3/1960 | Woodling | 285—341 |
| 2,934,362 | 4/1960 | Franck | 285—382.7 X |

FOREIGN PATENTS

| 1,224,852 | 2/1960 | France. |
| 749,395 | 5/1956 | Great Britain. |
| 881,304 | 11/1961 | Great Britain. |

CARL W. TOMLIN, *Primary Examiner.*

THOMAS F. CALLAGHAN, *Examiner.*